(12) United States Patent
Ta

(10) Patent No.: US 11,071,956 B2
(45) Date of Patent: Jul. 27, 2021

(54) DEVICE AND PROCESS FOR A MICROMIXER HAVING A TRAPEZOIDAL ZIGZAG CHANNEL

(71) Applicant: Bao Quoc Ta, Quang Ngai (VN)

(72) Inventor: Bao Quoc Ta, Quang Ngai (VN)

(73) Assignee: Ton Duc Thang University, Ho Chi Minh City (VN)

( * ) Notice: Subject to any disclaimer, the term of this patent is extended or adjusted under 35 U.S.C. 154(b) by 0 days.

(21) Appl. No.: 14/828,461

(22) Filed: Aug. 17, 2015

(65) Prior Publication Data
US 2020/0306705 A1  Oct. 1, 2020

(51) Int. Cl.
*B01F 13/00* (2006.01)
*B01F 5/06* (2006.01)
*B29C 33/42* (2006.01)
*B29K 83/00* (2006.01)
*B29L 31/00* (2006.01)

(52) U.S. Cl.
CPC ........ *B01F 13/0059* (2013.01); *B01F 5/0603* (2013.01); *B01F 5/0647* (2013.01); *B29C 33/42* (2013.01); *B29K 2083/00* (2013.01); *B29L 2031/756* (2013.01)

(58) Field of Classification Search
CPC .. B01F 13/0059; B01F 5/0603; B01F 5/0647; B01F 5/0646; B01F 2215/0431; B01F 5/0403; B29C 33/56; B29C 65/00; B29C 33/3842; B29C 33/42; B29K 2083/00; B29L 2031/756; B29L 2300/0816; B29L 2300/0867; B29L 3/5027; B29L 2200/027; B29L 2300/0883; B29L 2300/0874; B01J 19/0093; B01J 2219/00889; B01J 2219/00783; B01J 2219/0086

USPC .................................................. 366/336, 340
See application file for complete search history.

(56) References Cited

U.S. PATENT DOCUMENTS

| | | | |
|---|---|---|---|
| 4,572,435 A * | 2/1986 | Thompson | B05B 1/14 137/561 A |
| 5,376,252 A * | 12/1994 | Ekstrom | B01D 57/02 204/603 |
| 5,726,026 A * | 3/1998 | Wilding | B01D 67/0062 366/DIG. 3 |
| 5,744,366 A * | 4/1998 | Kricka | B01D 61/18 422/400 |
| 5,842,787 A * | 12/1998 | Kopf-Sill | B01J 19/0093 366/340 |
| 5,904,424 A * | 5/1999 | Schwesinger | B01F 5/0604 366/336 |
| 5,957,579 A * | 9/1999 | Kopf-Sill | B01L 3/502746 138/42 |
| 6,186,660 B1 * | 2/2001 | Kopf-Sill | B01J 19/0093 138/42 |

(Continued)

*Primary Examiner* — Tony G Soohoo

(57) ABSTRACT

A micromixer and a process of fabricating the same are disclosed which comprises a bottom housing layer having an receiving section, a mixing channel, and an output section; a top housing layer further comprising a plurality of inlet passages, and an outlet passage for obtaining the resulting mixture; the receiving section is coupled to the plurality of inlet passages, and the output section is coupled with the outlet passage; and the mixing channel further comprising a plurality of parallel zigzag channels created by a first zigzag mixing unit and a second zigzag mixing unit.

11 Claims, 3 Drawing Sheets

(56) References Cited

U.S. PATENT DOCUMENTS

| | | | | |
|---|---|---|---|---|
| 6,517,234 B1 * | 2/2003 | Kopf-Sill | ............ | B01J 19/0093 |
| | | | | 366/340 |
| 6,935,772 B2 * | 8/2005 | Karp | ............... | B01D 17/00 |
| | | | | 137/550 |
| 7,753,580 B2 * | 7/2010 | Woehl | ............... | B01F 5/0453 |
| | | | | 366/178.1 |
| 8,430,558 B1 * | 4/2013 | Yakhshi Tafti | ....... | B01F 5/0603 |
| | | | | 366/340 |
| 8,721,992 B2 * | 5/2014 | Yamada | ............ | B01L 3/502707 |
| | | | | 422/503 |
| 9,259,693 B2 * | 2/2016 | Tafti | ................. | B01F 5/065 |
| 10,118,149 B2 * | 11/2018 | Reintjens | ............ | B01J 19/0093 |
| 2004/0262223 A1 * | 12/2004 | Strook | ............... | B01F 5/0646 |
| | | | | 210/634 |
| 2005/0272144 A1 * | 12/2005 | Sando | ............... | B01F 13/0059 |
| | | | | 435/287.2 |
| 2014/0081038 A1 * | 3/2014 | Reintjens | ............ | B01F 5/0647 |
| | | | | 556/471 |

* cited by examiner

DEVICE AND PROCESS FOR A MICROMIXER HAVING A TRAPEZOIDAL ZIGZAG CHANNEL

FIELD OF THE INVENTION

The present invention relates to a mixer. In particular, the present invention relates to a passive micromixer for mixing multi-phase gas or liquid mixtures.

BACKGROUND ART

Micromixers are used when two or more substances must be combined to form a mixture which has special properties. Conventional micromixers are divided into active and passive micromixers. Active micromixers require external supply of energy, work to supply energy to the mixing of liquids. One way to supply external energy is to use high frequency oscillating diaphragms excited by a piezoelectric element. Another to supply external energy is to use electrical energy. Obviously, active micromixers require high power consumption, complex manufacturing process, and expensive. Furthermore, active micromixers have large foot-print and are difficult to integrate into lab on chip (LOC) or microfluiditic devices.

Prior art passive micromixers do not require any additional active elements. They do not have large foot-print, low cost, and easy to integrate with LOC and microfluiditic devices. However, the prior-art passive micromixers, such as T and Y micromixers, fail to provide good flow and effective mixing mechanism. As a result, the final mixtures is poorly mixed and thus do not have the desired properties.

Therefore what is needed is a passive micromixer that overcomes the above described problems.

SUMMARY OF THE INVENTION

Accordingly, an objective of the present invention is to provide a micromixer which comprises a bottom housing layer having an receiving section, a mixing channel, and an output section; a top housing layer further comprising a plurality of inlet passages, and an outlet passage for obtaining the resulting mixture; the receiving section is coupled to the plurality of inlet passages, the output section is coupled with the outlet passage; and the mixing channel further comprising a plurality of parallel zigzag channels created by a first zigzag element and a second zigzag element.

Another aspect of the present invention also provides a process of fabricating a micromixer which comprises prepare a silicon wafer, provide a photoresist by spin coating on the surface of the silicon water, transfer a trapezoid zigzag mask pattern to the photoresist, create a trapezoid zigzag (TZ) replica mold where the TZ replica mold further comprises: a bottom housing layer further comprising an receiving section, a mixing channel, and an output section; and an outlet passage for obtaining the resulting mixture of the microfludistic materials; the mixing channel further comprising a plurality of parallel zigzag channels created by a first zigzag element and a second zigzag element.

These and other advantages of the present invention will no doubt become obvious to those of ordinary skill in the art after having read the following detailed description of the preferred embodiments, which are illustrated in the various drawing Figures.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
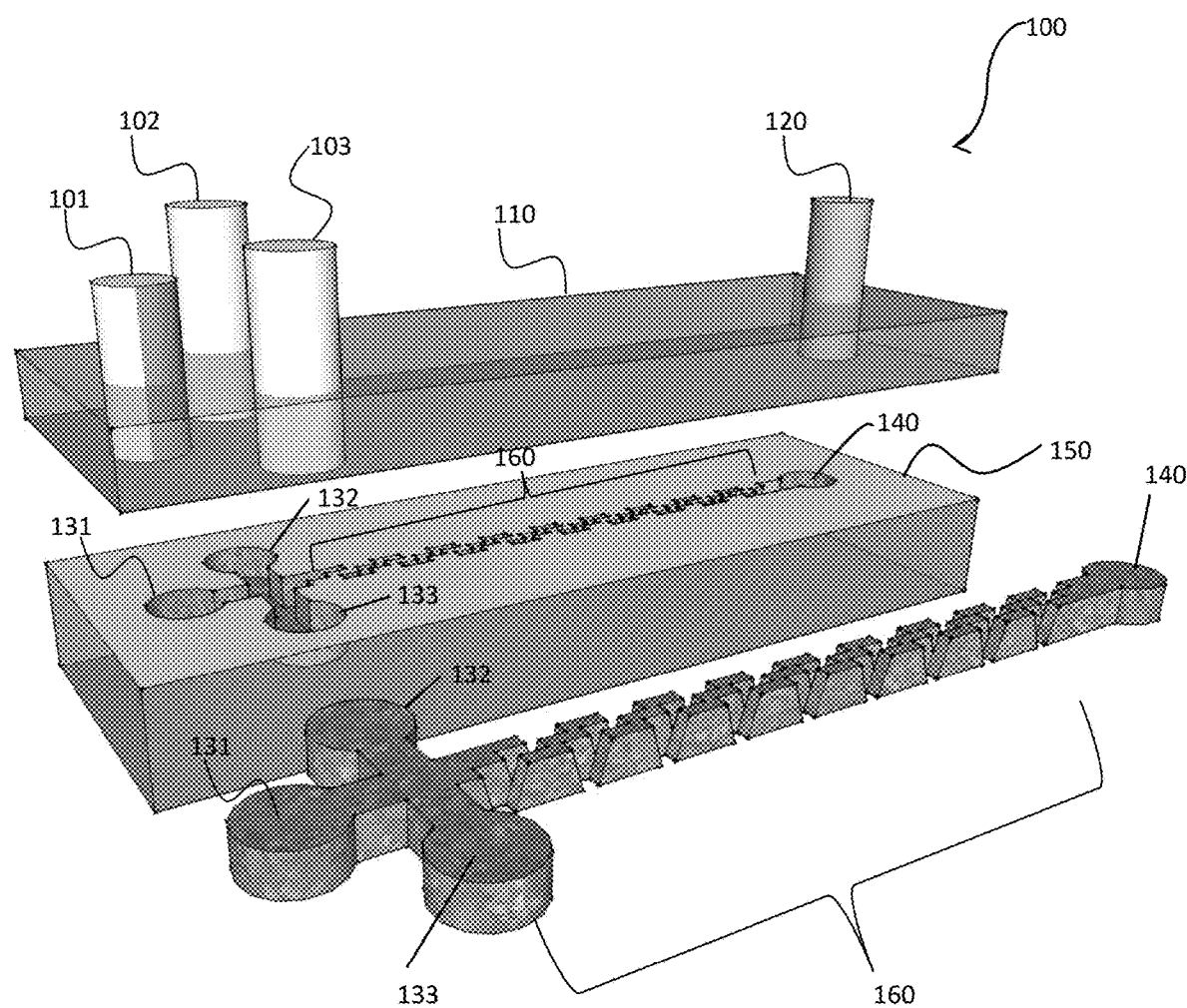
FIG. 1 illustrates a structure of a trapezoid zigzag (TZ) micromixer in accordance with an embodiment of the present invention.

Now referring to FIG. 1 which illustrates a structure of a trapezoid zigzag (TZ) micromixer 100 in accordance with an embodiment of the present invention. Micromixer 100 includes a bottom housing layer 110 having a receiving section 130, a mixing channel 160, and an output section 140. Bonded on top of bottom housing layer 110 is a top housing layer 110 which includes a plurality of inlet passages for injecting different of microfluidic materials. In one embodiment, the plurality of inlet passages includes, but is not limited to, a first inlet passage 101, a second inlet passage 102, and a third inlet passage 103. Top housing layer 110 also includes an outlet passage 120 located at the opposite end with first, second, and third input passages 101-103. Outlet passage 120 is operative to obtain the resulting mixture of microfluditic materials injected into first inlet passage 101, second inlet passage 102, and third inlet passage 103.

Continuing with FIG. 1, receiving section 140 is coupled to first inlet passage 101, second inlet passage 102, and third inlet passage 103; and output section 140 is coupled with outlet passage 120 to form micromixer 100. The details of mixing channel 160 are now described in the following FIG. 2

Figure 2:
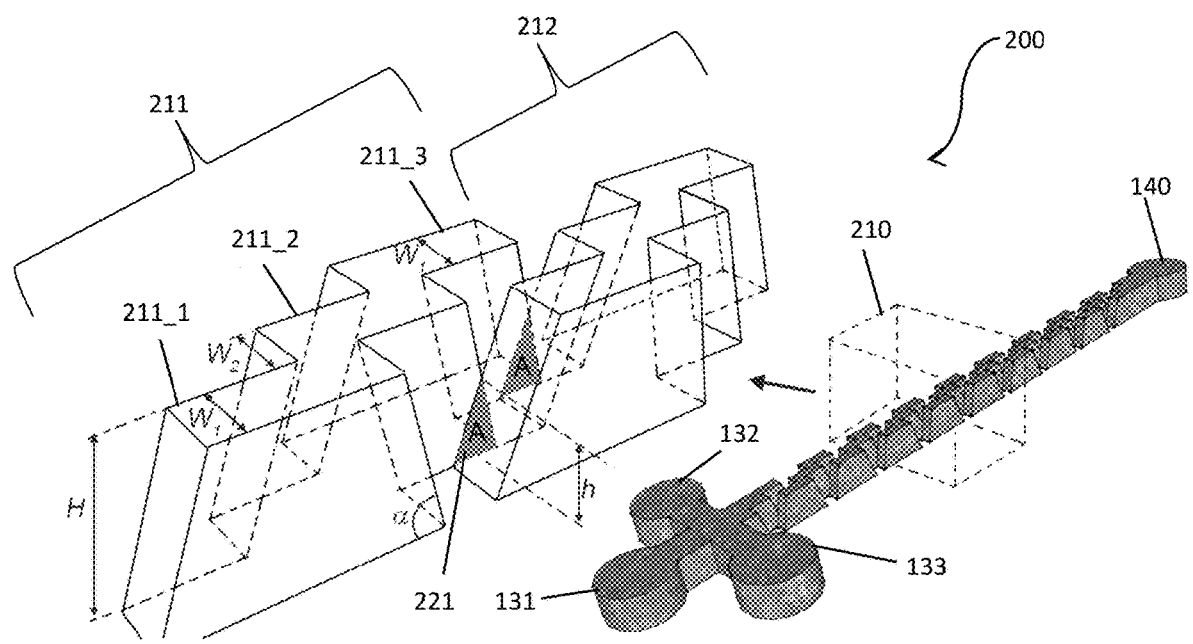
FIG. 2 illustrates a segment of the mixing unit in accordance with an embodiment of the present invention.

Now referring to FIG. 2 which illustrates a segment 210 of mixing channel 160 in accordance with an embodiment of the present invention. Segment 210 shows a magnified structure of a first zigzag element 211 and second zigzag element 212. In one embodiment, first zigzag element 211 and second zigzag element 212, each has a first segment 211_1, a second segment 211_2, and a third segment 211_3.

Continuing with FIG. 2, in one embodiment of the present invention, first segment 211_1, second segment 211_2, and third segment 211_3 all have the same geometrical shape and connected together in series to create a zigzag shape. Furthermore, first segment 211_1 has a first thickness $W_1$, second segment 211_2 has a second thickness $W_2$, and third segment 211_3 has a third thickness $W_3$. In one embodiment, first thickness $W_1$ equals to second thickness $W_2$ which equals to third thickness $W_3$, all equal to 70 μm. First segment 211_1, second segment 211_2, and third segment 211_3 all have the same height of 200 μm.

Continuing still with FIG. 2, first segment 211_1, second segment 211_2, and third segment 211_3 is a isosceles trapezoidal surface whose lateral side forms an 75° angle with a bottom base. Next, second zigzag element 212 is placed in a position such it overlaps with first zigzag segment 211 to form a right angle triangle A having a height of 100 μm.

Continuing with FIG. 2, in operation, liquids, gases, or materials with different viscous phases are injected into inlet passages 101-103. These liquids, gases, or materials with different viscous phases undergo mixing mechanism of mixing channel 160. The mixing mechanism of mixing channel 160 provides splitting-recombining, stretching-folding, twisting, vortex, and chaotic advection for these liquids, gases, or material with different viscous phases. Finally, the final mixture is received at outlet passage 120.

Figure 3:
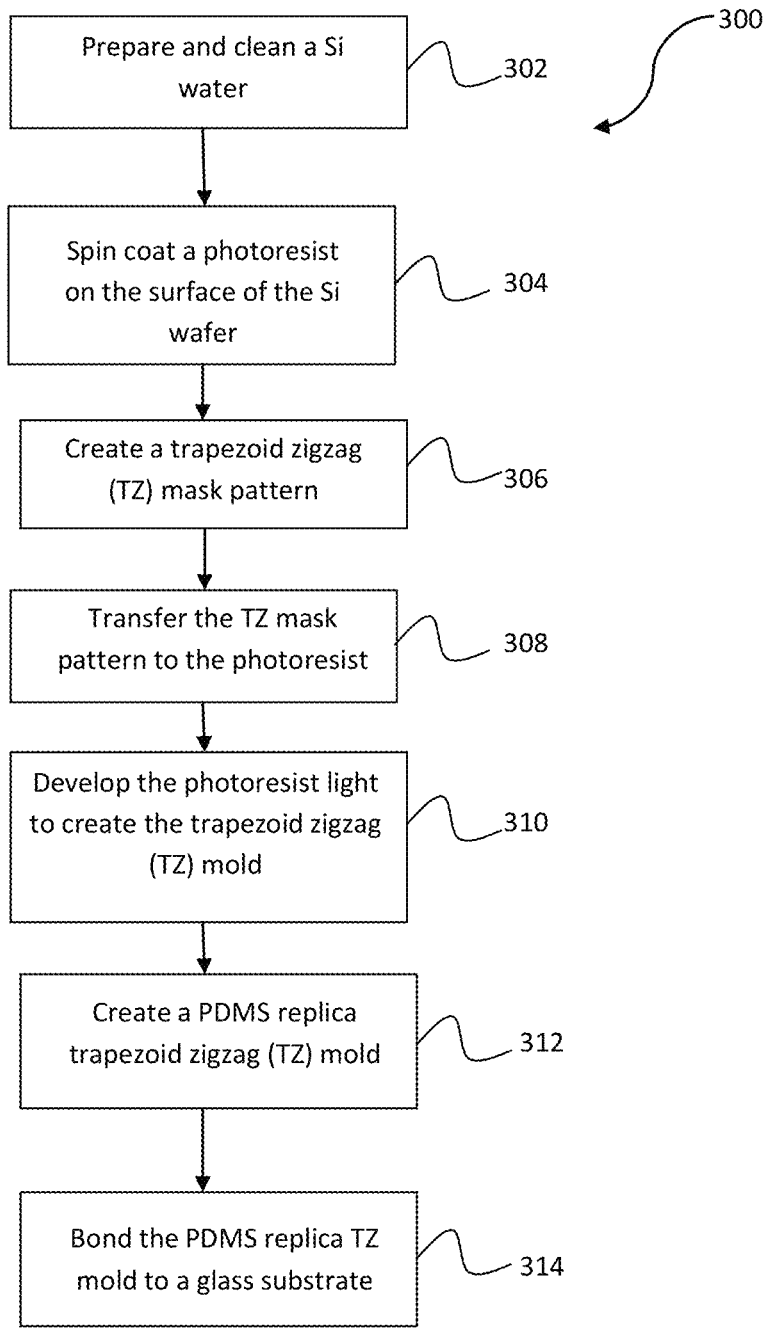
FIG. 3 illustrates a process for fabricating a trapezoid zigzag micromixer in accordance with an embodiment of the present invention.

Now referring to FIG. 3, a process 300 for fabricating micromixer 100 is illustrated. Process 300 includes three main steps: (1) making a replica trapezoid zigzag (TZ) mold having mixing channel 160 as described above in FIG. 1-FIG. 2; (2) create connectors to the inlet passages 101-103 and outlet 120 of the TZ micromixer 100; and (3) bond the replica mold with a glass substrate. The details of steps (1)-(3) are hereby described as follows.

At step 302, a silicon wafer was cleaned to remove contaminations on the water surface. The wafer is then dehydrated on a hotplate at 105° C. for 10 minutes to remove the solvent.

At step 302, a photoresist is coated on the wafer surface. More particularly, a negative photoresist SU-8 2150 is spin coated on the wafer surface. The thickness of the photoresist is any in the range 150-500 m. After spinning coating, the photoresist is baked on a hotplate at 75° C. for 15 minutes, and then at 105° C. for one hour.

At step 306, a trapezoid zigzag mask pattern is made. More particularly, trapezoid zigzag mask is made in accordance with the geometry and dimensions described in details in FIG. 1-FIG. 2 above.

At step 308, the TZ mask pattern is transferred to the photoresist. The transferring is accomplished by exposure under ultraviolet (UV) light. To create a trapezoid blades, two inclined exposures were implemented, with an incline angle of any value in the range 60-80°. The exposure energy of UV light for each exposure is 800 mJ cm$^{-1}$ at 10 mW cm$^{-1}$. After exposures, glycerol was spread over the wafer surface to enhance the hard contact between the plastic mask and the wafter, as well as to reduce diffraction effects. The post exposure process, including incubation was done on a hotplate at 105° C. for 10 seconds.

At step 310, the development process is carried out with the aid of ultrasonic machine. After that, the wafer is washed by Isopropanol. At this stage, a TZ mold of the micromixer 100 is produced.

At step 312, the TZ mold from step 310 is used as a master mold for making the replica TZ mold. This process is as follows. First, the patterned wafer is covered by evaporating silane ($SiH_4$) using high vacuum chamber for one hour to facilitate mold release. A polydimethylsiloxane (PDMS) solution is poured onto the TZ mold, with target thickness for the PDMS layer. The PDMS solution, consisting of Sylgard 184 silicon elastomer and curing agent with a 10:1 ratio by weight, was first degassed in the vacuum chamber connected with a vacuum pump to remove air bubbles. The PDMS is degassed for 30 minutes and cured at 65° C. for at least 3 hours in the oven.

Continuing with step 312, silicone tubes ware utilized to create connectors to the inlets passages 101-103 and outlet 120 of micromixer 100. The PDMS mold is cut and peeled off from the master TZ mold.

Finally, at step 314, the PDMS mold and glass substrate are treated with O2 plasma for 1 minute and annealed at 65° C. for 2 hours in order to bond them together permanently. The complete TZ micromixer 100 is completely created after this step.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A micromixer device, comprising:
    a bottom housing layer further comprising an receiving section, a mixing channel, and an output section;
    a top housing layer further comprising a plurality of inlet passages for injecting different microfluidic materials, and an outlet passage for obtaining the resulting mixture of said different microfluidic materials, wherein said receiving section is coupled to said plurality of inlet passages, and said output section is coupled to said outlet passage, and wherein said mixing channel further comprising a plurality of zigzag channels arranged parallel to one another and non-orthogonal to a first direction from said receiving section to said output section so as to cause said different microfluidic materials to mix and flow along said first direction; wherein each of said plurality of zigzag channels is formed between two three-dimensional (3D) zigzag walls, each comprising a series of three-dimensional (3D) segments each having a trapezoidal surface area in said second direction.

2. The micromixer device of claim 1, wherein said trapezoidal surface areas are connected together in tandem.

3. The micromixer device of claim 2 wherein said series of 3D zigzag walls is arranged to intersect one another at a middle 3D segment to form first triangular overlaps.

4. The micromixer device of claim 3 wherein said series of 3D segments comprises a first segment, a second segment, and a third segment connected together in series, wherein a back edge of said first segment is connected to the front edge of said second segment and the back edge of said second segment is connected to the front edge of said third segment forming second triangular overlaps.

5. The micromixer device of claim 2, wherein said first segment has a first thickness, said second segment has a second thickness, and said third segment has a third thickness.

6. The micromixer device of claim 5 wherein said first thickness, said second thickness, and said third thickness equal to one another and to 70 μm.

7. The micromixer device of claim 6 wherein said first segment, said second segment, and said third segment each comprises a isosceles trapezoidal surface whose lateral side forms an angle with said bottom housing layer.

8. The micromixer device of claim 5 wherein said lateral sides of said trapezoidal surface area form a 75 degree angle with said bottom housing layer.

9. The micromixer device of claim 2, wherein said first segment, said second segment, and said third segment all have the same height and equal to 200 μm.

10. The micromixer device of claim 9 wherein said first triangular overlaps and said second triangular overlaps are isosceles triangles.

11. The micromixer device of claim 10 wherein said trapezoid surface area of said first segment and said second segment are larger than said trapezoid surface area of said second segment.

* * * * *